(12) United States Patent
Jackson et al.

(10) Patent No.: US 8,255,470 B2
(45) Date of Patent: Aug. 28, 2012

(54) SYSTEM AND METHOD FOR MESSAGE RECALL IN A UNIFIED MESSAGING

(75) Inventors: James Jackson, Austin, TX (US); Niral S. Sheth, Austin, TX (US); Mehrad Yasrebi, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 209 days.

(21) Appl. No.: 12/566,778

(22) Filed: Sep. 25, 2009

(65) Prior Publication Data

US 2011/0078247 A1  Mar. 31, 2011

(51) Int. Cl.
*G06F 15/16* (2006.01)
*H04M 11/00* (2006.01)

(52) U.S. Cl. ..................... 709/206; 379/88.13
(58) Field of Classification Search .................. 709/206; 379/88.13; 455/412.1
See application file for complete search history.

(56) References Cited

U.S. PATENT DOCUMENTS

| | | | |
|---|---|---|---|
| 6,175,858 B1 | 1/2001 | Bulfer et al. | |
| 7,257,201 B2 * | 8/2007 | Singh et al. | 379/88.13 |
| 7,694,128 B2 * | 4/2010 | Judge et al. | 713/152 |
| 7,849,213 B1 * | 12/2010 | Borghetti | 709/238 |
| 2003/0081754 A1 * | 5/2003 | Esparza et al. | 379/221.01 |
| 2005/0267937 A1 | 12/2005 | Daniels et al. | |
| 2007/0086582 A1 * | 4/2007 | Tai et al. | 379/114.01 |
| 2007/0286354 A1 | 12/2007 | Shaffer et al. | |
| 2008/0317228 A1 * | 12/2008 | Kay et al. | 379/201.01 |
| 2009/0098859 A1 * | 4/2009 | Kamdar et al. | 455/412.1 |
| 2010/0057869 A1 * | 3/2010 | Stavrou et al. | 709/206 |

* cited by examiner

*Primary Examiner* — Asghar Bilgram

(57) ABSTRACT

A method and system for managing messages in a unified messaging (UM) platform to enable message recall is disclosed. The UM platform deposits a message from a sender into a UM mailbox of a recipient. It is then determined whether the sender of the message is a UM subscriber. If the sender is a UM subscriber, a copy of the message or a link to the message is deposited into a UM mailbox of the sender. The UM platform then provides a message recall option with the copy of the message or the link to the message in the UM mailbox of the sender. If the sender is not a UM subscriber, a recall message including a randomly generated message recall URL is sent to the sender. This allows the sender to select the randomly generated message recall URL to send a message recall request to the UM platform, which deletes the message from the mailbox of the recipient in response to the message recall request.

12 Claims, 5 Drawing Sheets

SYSTEM AND METHOD FOR MESSAGE RECALL IN A UNIFIED MESSAGING

BACKGROUND OF THE INVENTION

The present invention relates generally to unified messaging and more particularly to message recall in a unified messaging platform environment.

Unified messaging is the integration of multiple (typically two or more) types of communication (e.g., email, voicemail, short message service (SMS), fax, etc.) into a single, unified message store (e.g., a unified messaging platform) accessible from a variety of user devices. Unified messaging is typically provided by a service provider, which may be the same service provider that provides telephone service.

There are many situations in which a message is sent and the sender later wishes to recall the message. However, the sender of a message is typically unable to review and recall a message that has already been sent. Message recall capability has been implemented in some email environments through proprietary protocols, but this capability is typically only available in closed user groups. Accordingly, a method for message recall in a unified messaging environment that is available to subscribers and non-subscribers is desirable.

BRIEF SUMMARY OF THE INVENTION

The present invention provides a method and system for message recall in a unified messaging (UM) platform environment. Embodiments of the present invention provide the ability to recall or withdraw a sent message, such as an email, voicemail, fax, etc., via a plurality of interfaces. Embodiments of the present invention provide message recall capability for a caller that is a UM subscriber and for a caller that is not a UM subscriber.

In one embodiment of the present invention, a UM platform deposits a message from a sender into a UM mailbox of a recipient. It is then determined whether the sender of the message is a UM subscriber. If the sender is a UM subscriber, a copy of the message or a link to the message is deposited into a UM mailbox of the sender. The UM platform then provides a message recall option with the copy of the message or the link to the message in the UM mailbox of the sender. If the sender is not a UM subscriber, a recall message including a randomly generated message recall URL is sent to the sender. This allows the sender to select the randomly generated message recall URL to send a message recall request to the UM platform, which deletes the message from the mailbox of the recipient in response to the message recall request.

These and other advantages of the invention will be apparent to those of ordinary skill in the art by reference to the following detailed description and the accompanying drawings.

DETAILED DESCRIPTION

Embodiments of the present invention are directed to an enhanced unified messaging (UM) system, which provides message recall capabilities.

Figure 1:
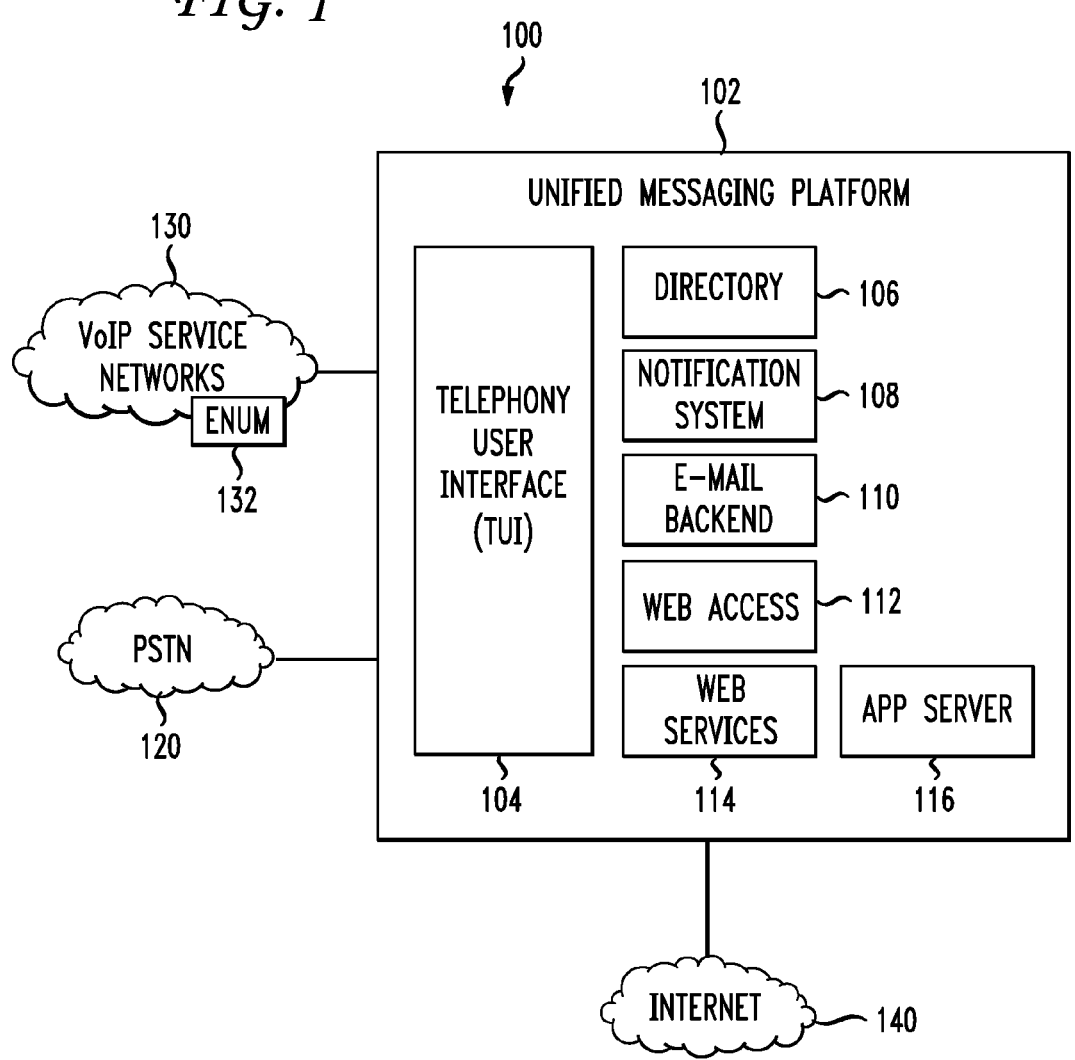
FIG. 1 illustrates a unified messaging system according to an embodiment of the present invention.

FIG. 1 illustrates a unified messaging system 100 according to an embodiment of the present invention. Unified messaging (UM) system 100 includes a UM platform 102. The UM 102 platform provides integrated services such as voicemail, fax, and email via a number of access mechanisms such as the Telephony User Interface (TUI) 104 and Web Access Interface 112. The UM platform 102 connects to the traditional public switched telephone network (PSTN) 120 as well as voice over internet protocol (VoIP) networks 130 which provide next generation VoIP Services. For example, such VoIP services can be IP multimedia subsystem (IMS)-based and include an E.164 Number Mapping (ENUM) server 132 which provides telephone number mapping functionality. The ENUM server 132 performs ENUM queries which lookup information such as an email address, short message service (SMS) information, session initiation protocol (SIP) information, etc., based on a telephone number.

The UM platform 102 includes TUI 104, Directory 106, Notification System 108, Email Backend 110, Web Access Interface 112, Web Service Interface 114, and Application Server 116. TUI 104 provides an interface for subscribers to access UM platform 102 via the telephone and includes call processing infrastructure such Session Border Controllers, Gateways, Call Agents, etc., as well as Application Servers and Media Servers. The Media Servers may perform functions such as Text-to-Speech (TTS) and Automatic Speech Recognition (ASR). Directory 106 stores enterprise settings, subscriber settings, etc. Within the UM platform 102, all messages (e.g., voicemail, email, fax, etc.) are stored as emails via the Email Backend 110. Notification System 108 notifies subscribers of new messages via a number of different mechanisms. For example, the Notification System 108 can use SMS messaging, instant messaging, etc., to notify subscribers of new messages. Web Access Interface 112 provides an interface for subscribers to access messages via the Internet 140. Web Services Interface 114 provides an application programming interface (API) for integration of messages stored on the UM platform 102 with other external web portals and the like.

According to an embodiment of the present invention, the Directory 106 provides information that indicates whether messages sent to a mailbox in the UM platform 102 are recall-eligible. Application Server 116 inserts random URLs into outbound email messages for message recall notification. Such email messages with random URLs are sent to a sender of each such recall-eligible message to provide the sender with a link to recall the message. The Application Server 116 processes the inbound recall requests when the links are activated (e.g., by the sender clicking the link the message recall email). Note that the message recall links (URLs) are deactivated once the recipient accesses the original message. The Application Server 116 communicates with the UM platform 102 via web services interface 114 to perform the recall function. The Web Services Interface 114 processes an incoming recall request, determines if the target mailbox (of the message recipient) allows message recall, determines if the message is still unread, deletes the message, and notifies both parties.

The TUI 104 can be adapted to provide new options for message recall in the case that a caller is a UM subscriber. New mailbox Class-of-Service and attributes may be introduced to determine whether or not message recall is enabled and allowed for a particular subscriber mailbox. Such Class-of-Service and various other settings information may be stored in Directory 106 and/or other components of UM platform 102.

Figure 2:
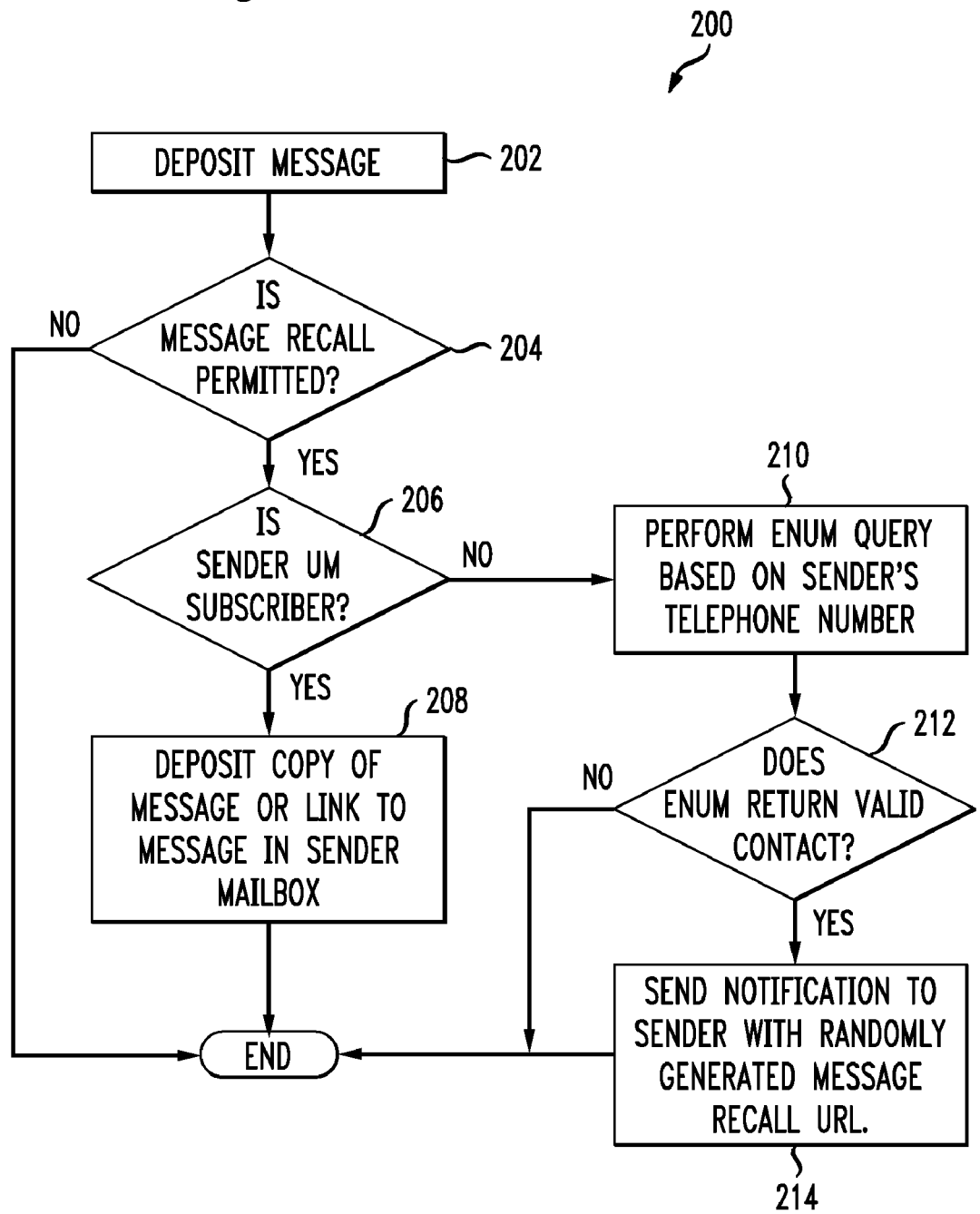
FIG. 2 illustrates a method for handling messages at a UM platform according to an embodiment of the present invention.

FIG. 2 illustrates a method 200 for sending recall messages to senders of messages by a UM platform 102 according to an embodiment of the present invention. Although the terms "sender" and "recipient" are used herein to designate the sender and recipient of a message, it is to be understood that these terms are not intended to limit the present invention to a particular type of message. As used herein a sender can leave/send any type of message supported by the UM platform 102 (e.g., voice message, email, fax, etc.) via any type of interface (e.g., TUI 104, Web Access Interface 112, web portal in communication with Web Services Interface 114, etc.). For example, in one embodiment the sender may be a caller leaving a voicemail message and the recipient may be a callee to whom the call from the caller was directed. Senders may send messages (e.g., voice messages using email attachments or FAX messages) to subscribers of UM platform 102 using email addresses of such subscribers. A sender may also use other addresses (e.g., a telephone number) of a recipient to send other message types (e.g., SMS and voice messages) to that recipient.

As illustrated in FIG. 2, at step 202, a message from a sender is deposited into the UM mailbox of a recipient. At step 204, it is determined whether the message recall is permitted based on settings associated with the mailbox of the recipient. Application Server 116 can make such a determination by consulting, for example, with Directory 106. If the settings associated with the mailbox of the recipient indicate that message recall is not permitted, the method ends (216). If the settings indicate that message recall is permitted, the method proceeds to step 206.

At step 206, it is determined whether the sender of the message is a UM subscriber. For example, the UM platform 102 can determine if a sender of a message is UM subscriber based on subscriber information stored in the directory 106. If the sender is a UM subscriber, the method proceeds to step 208. If it is determined that the sender is not a UM subscriber, the method proceeds to step 210.

At step 208, when the sender is a UM subscriber, a copy of the original message or link to the original message is deposited by the Application Server 116 into the UM mailbox of the sender. The copy of the message or link to the message can be deposited into a sent messages portion of the sender's mailbox. The UM platform 102 provides an option associated with the copy of the message or link to the message for the sender to recall the original message deposited in the mailbox of the recipient. For example, the copy of the message or link to the message can include a HyperText Markup Language (HTML) hyperlink, button, etc., that, when selected by the sender, sends a request to recall the message to the UM platform 102.

At step 210, when the sender is not a UM subscriber, an ENUM query is performed by the Application Server 116 based on the sender's telephone number to determine at least one other contact mechanism (e.g., email, SMS, etc.) for the sender. At step 212, it is determined whether the ENUM query returned a valid contact mechanism (e.g., email, SMS, etc.) for the sender. If the ENUM query does not return a valid contact mechanism for the sender, the method ends (216). If the ENUM query does return a valid contact mechanism for the sender, the method proceeds to step 214. Note that steps 210 and 212 are directed to the case where the sender is a caller who is depositing a message via a telephone. If the sender is sending the message via an email, then the UM platform 102 will have an email address for the sender and can proceed directly to step 214 from step 206.

At step 214, a notification is sent to the sender including a randomly generated message recall URL. The notification can be sent using the contact mechanism (email, SMS, etc.) retrieved via the ENUM search of step 210. For example, an email can be sent to the sender of the original message including a randomly generated message recall URL. The message recall URL can be a link that is selectable by the sender to send a request to the UM platform 102 to recall the original message. The message recall URL is randomly generated by the application server 116 of the UM platform 102 and associated with the message in the recipient's mailbox. The URL becomes deactivated by the application server 116 once the recipient reads the message. The method ends at 216.

Figure 3:
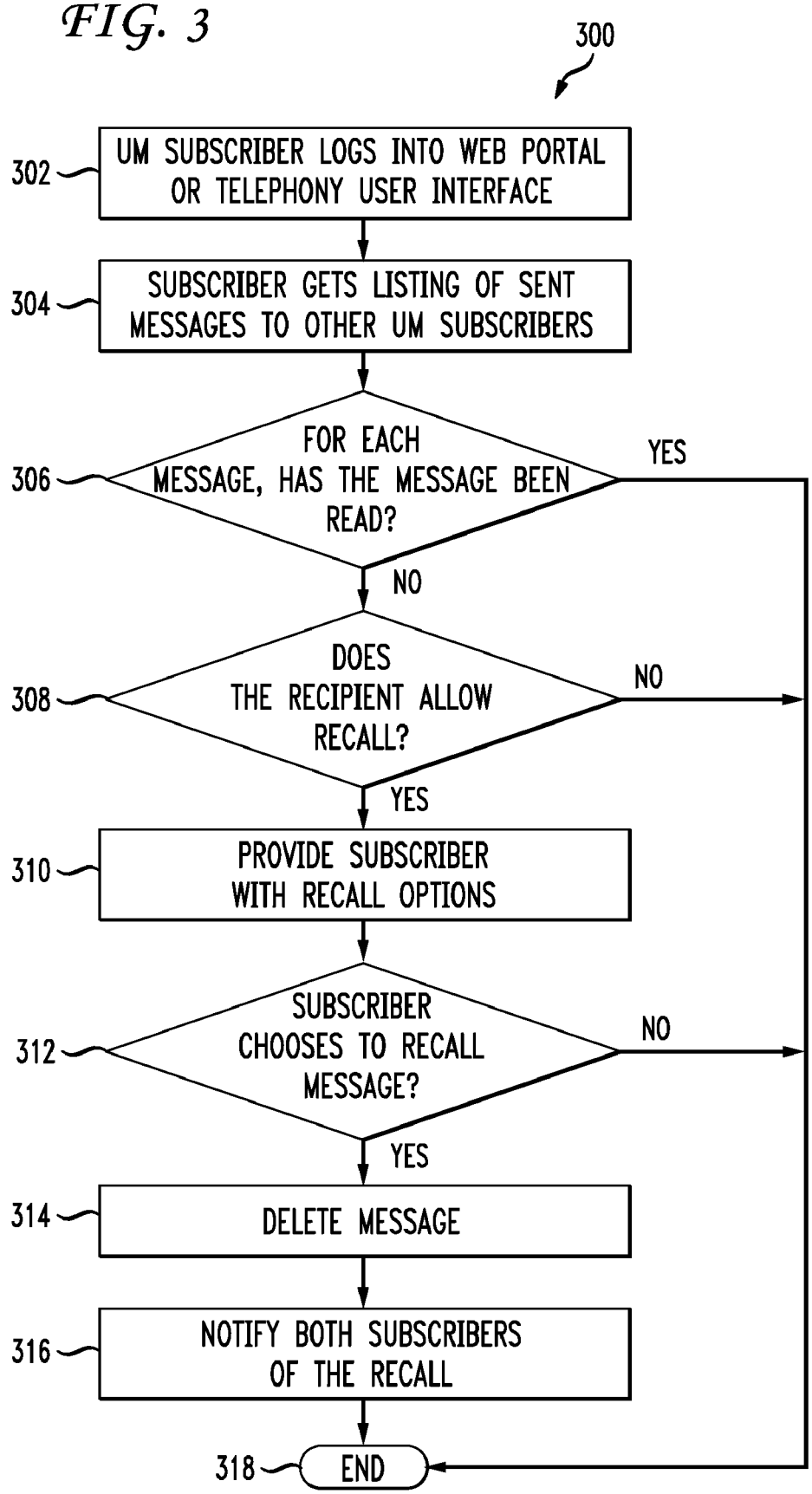
FIG. 3 illustrates a method of a UM platform recalling a message when a sender is a UM subscriber.

FIG. 3 illustrates a method 300 of a UM platform 102 recalling a message when a sender is a UM subscriber. At step 302, a UM subscriber logs in to the UM platform 102. For example, the UM subscriber can log into the UM platform 102 using the TUI 104 or the web access interface 112. At step 304, the UM platform provides 102 provides to the UM subscriber a listing of sent messages that have been sent to other UM subscribers.

At step 306, for each message sent to another UM subscriber it is determined whether the message has been read by the recipient. If a particular message has been read, the message cannot be recalled and the method ends (for that message) (318). If a message has not been read by the recipient, the method proceeds to step 308. At step 308, it is determined whether the recipient allows message recall. This is determined based on the settings associated with the mailbox of the recipient. If the recipient does not allow message recall, the message cannot be recalled and the method ends (318). If the recipient does allow message recall, the method proceeds to step 310. The particular component (e.g., the TUI 104 or the Web Services interface 114 or the Application Server 116) may use other components of UM platform 102 (e.g., the Application Server 116) to implement steps 306, 208, 310, 312, 314 and 316.

At step 310, the UM platform 102 provides message recall options to the subscriber. For example, the recall options can be provided to the subscriber via the Web Access Interface 112 by displaying a selectable option, such as a button, link, etc. that the subscriber can select to recall the corresponding message. The recall options can be provided to the subscriber via the TUI 104 by allowing the subscriber to select message recall using a DTMF selection or voice recognition.

At step 312, it is determined if the subscriber requests recall of a message based on input to the UM platform 102 from the subscriber. If the user does not select to recall a message the method ends (318). If the user selects to recall a message, the method proceeds to step 314. At step 314, the UM platform 102 deletes the message from the mailbox of the recipient. At step 316, the UM platform 102 notifies both subscribers (sender and recipient) of the message recall. For example, the notification system 108 can notify the subscribers via a system message, such as a SMS text message or an email message. The method ends at step 318.

Figure 4:
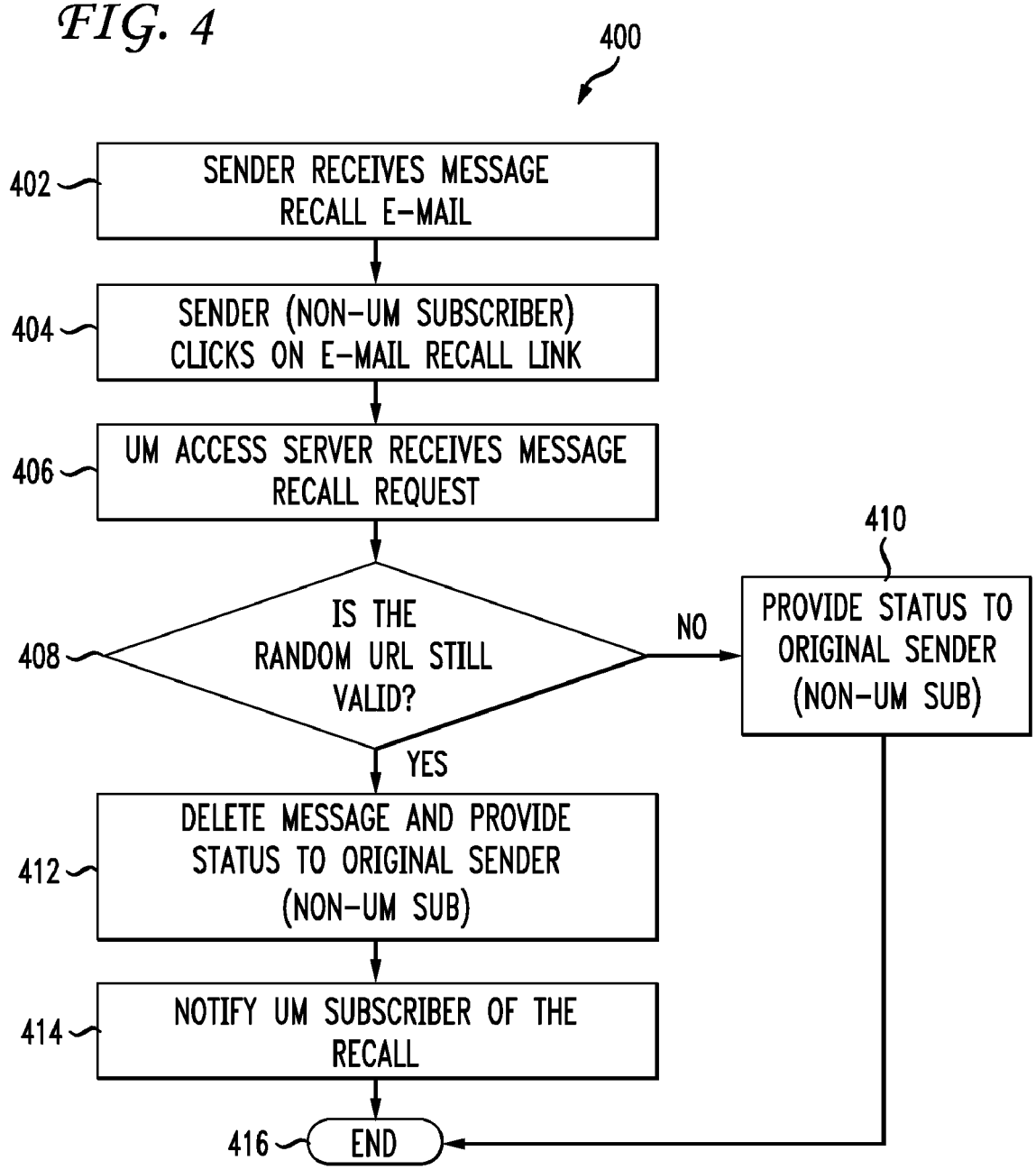
FIG. 4 illustrates a method of a UM platform recalling a message when a sender is not a UM subscriber.

FIG. 4 illustrates a method 400 of a UM platform 102 recalling a message when a sender is not a UM subscriber. Such senders may send messages (e.g., voice messages or FAX messages) to subscribers of UM platform 102 using email addresses of such subscribers. A sender may also use other addresses (e.g., a telephone number) of a recipient to send other message types (e.g., SMS and voice messages) to that recipient. At step 402, a sender of a message receives a message recall email from the UM platform. The message recall email includes a message recall URL hyperlink (link) associated with the message sent by the sender. At step 404, the sender selects the message recall link in the message recall email. The message recall URL selected by the user sends a message recall request to the UM platform 102.

At step 406, the Application Server 116 of the UM platform 102 receives the message recall request. At step 408, it is determined if the random URL is still valid. In order for the URL to still be valid, the associated message must still be unread. Furthermore, other parameters may be associated with the random URL, such as a certain lifetime, etc., that may be considered to determine if the random URL is still valid. If the random URL is not valid, the method proceeds to step 410. If the random URL is not valid, the method proceeds to step 412.

At step 410, when a URL is not valid (at step 408), the status is provided to the original sender. For example, the sender can be notified via an email from the Application Server 116 of UM platform 102 that the message cannot be recalled. Once the sender is notified of the status, the method ends (416).

At step 412, when a URL is valid (at step 408), the message associated with the random URL is deleted from the mailbox of the recipient and the status is provided to the sender. For example, when the message is deleted, the UM platform 102 can notify the sender via an email that the message has been successfully recalled. At step 414, the UM platform notifies the recipient (who is a UM subscriber) of the message recall. For example, the Notification System 108 can notify the recipient via a system message, such as a SMS text message or an email message. The method ends at step 416.

Figure 5:
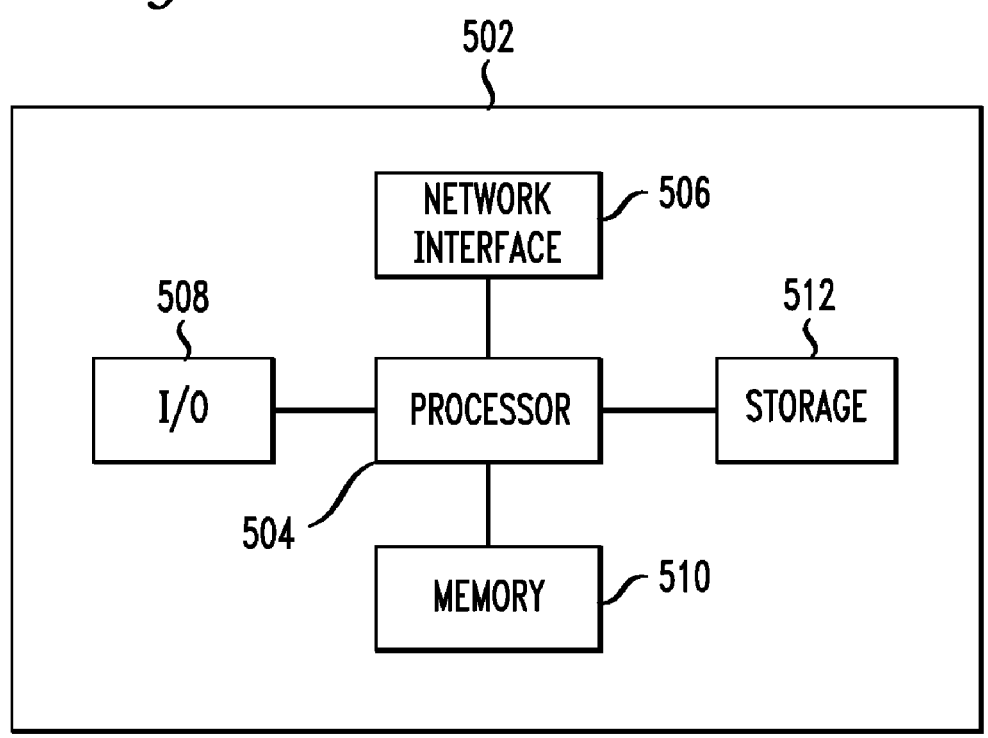
FIG. 5 is a high level block diagram of a computer capable of implementing the present invention.

The above described methods for message handling and message recall in a UM platform can be implemented on a computer using well-known computer processors, memory units, storage devices, computer software, and other components. Further, the UM platform 102 and all of the components of the UM platform 102 described above can be implemented on one or more such computers. A high-level block diagram of such a computer is illustrated in FIG. 5. Computer 502 contains a processor 504 which controls the overall operation of the computer 502 by executing computer program instructions which define such operation. The computer program instructions may be stored in a storage device 512, or other non-transitory computer readable medium (e.g., magnetic disk, CD ROM, etc.), and loaded into memory 510 when execution of the computer program instructions is desired. Thus, the method steps of FIGS. 2, 3, and 4 can be defined by the computer program instructions stored in the memory 510 and/or storage 512 and controlled by the processor 504 executing the computer program instructions. For example, the computer program instructions can be implemented as computer executable code programmed by one skilled in the art to perform an algorithm defined by the method steps of FIGS. 2, 3, and 4. Accordingly, by executing the computer program instructions, the processor 504 executes an algorithm defined by the method steps of FIGS. 2, 3, and 4. The computer 502 also includes one or more network interfaces 506 for communicating with other devices via a network. The computer 502 also includes input/output devices 508 that enable user interaction with the computer 502 (e.g., display, keyboard, mouse, speakers, buttons, etc.) One skilled in the art will recognize that an implementation of an actual computer could contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention. The various functional modules that are shown are for illustrative purposes only, and may be combined, rearranged and/or otherwise modified.

What is claimed is:

1. A method for managing messages in a Unified Messaging (UM) platform, comprising:
    depositing a message from a sender into a UM mailbox of a recipient;
    determining whether the sender of the message is a UM subscriber;
    if the sender is a UM subscriber, depositing one of a copy of the message and a link to the message in a UM mailbox of the sender; and
    if the sender is not a UM subscriber:
        sending a recall message including a randomly generated message recall URL to the sender,
        receiving a message recall request associated with the message in response to a selection of the subscriber of the randomly generated message recall URL,
        determining if the randomly generated message recall URL is valid,
        if the randomly generated message recall URL is valid, deleting the message from the UM mailbox of the recipient, and
        if the randomly generated message recall URL is not valid, notifying the sender that the message can not be recalled.

2. The method of claim 1, further comprising:
    determining whether message recall is permitted based on settings associated with the UM mailbox of the recipient prior to the step of determining whether the sender of the message is a UM subscriber.

3. The method of claim 1, wherein the sender is a caller, the message is a voicemail message, and the step of sending a recall message including a randomly generated message recall URL to the sender comprises:
    determining a contact mechanism associated with a telephone number of the sender using a ENUM query; and
    sending the recall message to the sender using the contact mechanism.

4. The method of claim 3, wherein the contact mechanism is an email address of the sender.

5. The method of claim 3, wherein the step of sending a recall message including a randomly generated message recall URL to the sender further comprises:
    determining whether the ENUM query returned a valid contact mechanism prior to the step of sending the recall message to the sender using the contact mechanism.

6. The method of claim 1, wherein the sender is a UM subscriber, further comprising:
    determining that the message has not been read by the recipient;

determining that the recipient allows message recall based on settings associated with the UM mailbox of the recipient;

providing the sender with a message recall option for the one of the copy of the message and the link to the message deposited in the UM mailbox of the sender;

receiving a user selection to recall the message; and deleting the message from the UM mailbox of the recipient.

7. The method of claim 6, further comprising:

notifying the sender and the recipient of the message recall.

8. The method of claim 1, further comprising, in response to deleting the message from the UM mailbox of the recipient:

notifying the sender of the status of the message; and notifying the recipient of the message recall.

9. A non-transitory computer readable medium encoded with computer executable instructions for managing messages in a Unified Messaging (UM) platform, the computer executable instructions defining a method comprising:

depositing a message from a sender into a UM mailbox of a recipient;

determining whether the sender of the message is a UM subscriber;

if the sender is a UM subscriber, depositing one of a copy of the message and a link to the message in a UM mailbox of the sender; and if the sender is not a UM subscriber:

sending a recall message including a randomly generated message recall URL to the sender, receiving a message recall request associated with the message in response to a selection of the subscriber of the randomly generated message recall URL, determining if the randomly generated message recall URL is valid, if the randomly generated message recall URL is valid, deleting the message from the UM mailbox of the recipient, and if the randomly generated message recall URL is not valid, notifying the sender that the message can not be recalled.

10. The computer readable medium of claim 9, further comprising computer executable instructions defining:

determining whether message recall is permitted based on settings associated with the UM mailbox of the recipient prior to the step of determining whether the sender of the message is a UM subscriber.

11. The computer readable medium of claim 9, wherein the sender is a caller, the message is a voicemail message, and the computer executable instructions defining sending a recall message including a randomly generated message recall URL to the sender comprise computer executable instructions defining:

determining a contact mechanism associated with a telephone number of the sender using a ENUM query; and sending the recall message to the sender using the contact mechanism.

12. The computer readable medium of claim 9, wherein the sender is a UM subscriber, further comprising computer executable instructions defining:

determining that the message has not been read by the recipient;

determining that the recipient allows message recall based on settings associated with the UM mailbox of the recipient;

providing the sender with a message recall option for the one of the copy of the message and the link to the message deposited in the UM mailbox of the sender;

receiving a user selection to recall the message; and deleting the message from the UM mailbox of the recipient.

* * * * *